(Model.)

A. FALES.
VARIABLE BENCH PLANE.

No. 348,198. Patented Aug. 31, 1886.

3 Sheets—Sheet 1.

WITNESSES:
Norris A. Clark
A. S. Browne

INVENTOR:
Amos Fales,
By his attorney,
J. S. Brown.

(Model.) 3 Sheets—Sheet 2.
A. FALES.
VARIABLE BENCH PLANE.
No. 348,198. Patented Aug. 31, 1886.
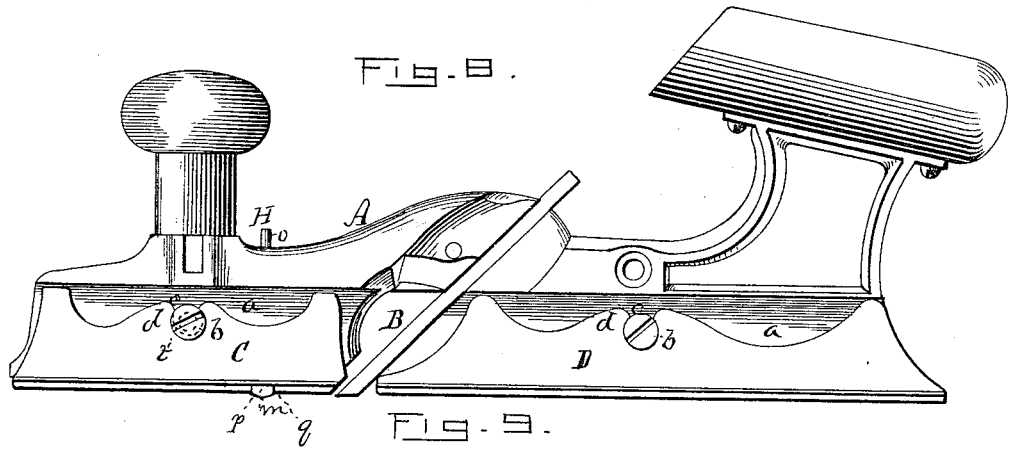
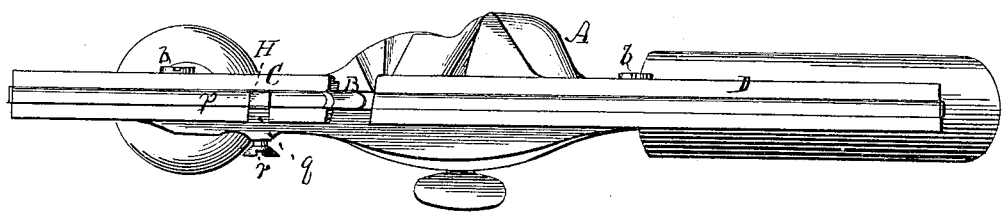
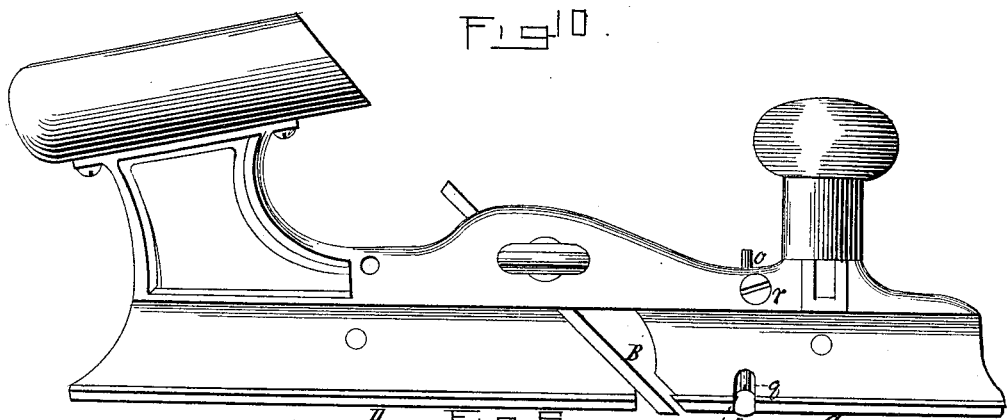
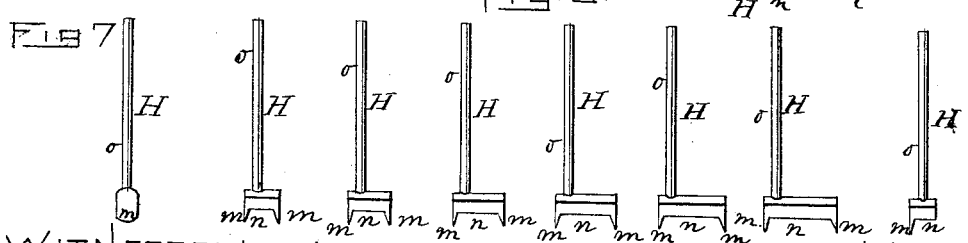
WITNESSES:
Norris A. Clark
A. S. Browne
INVENTOR:
Amos Fales,
By his attorney,
A. S. Browne (Model.) 3 Sheets—Sheet 3.
A. FALES.
VARIABLE BENCH PLANE.
No. 348,198. Patented Aug. 31, 1886.
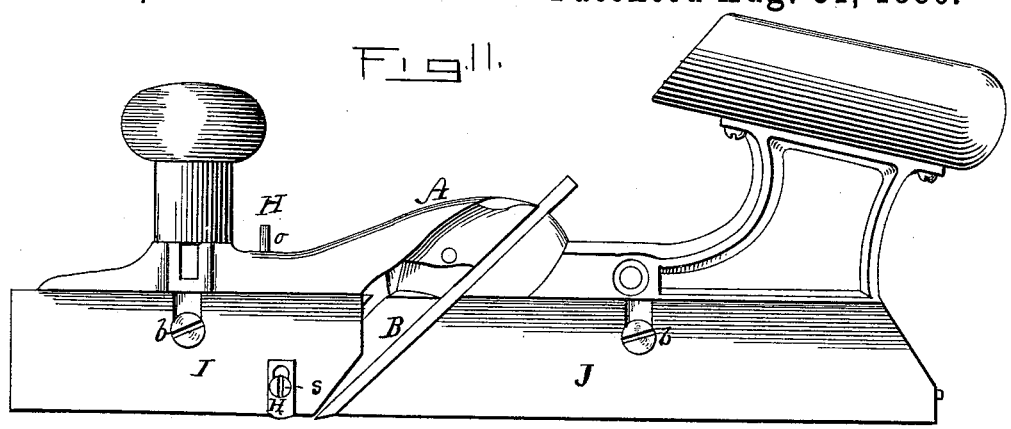
Fig. 11.
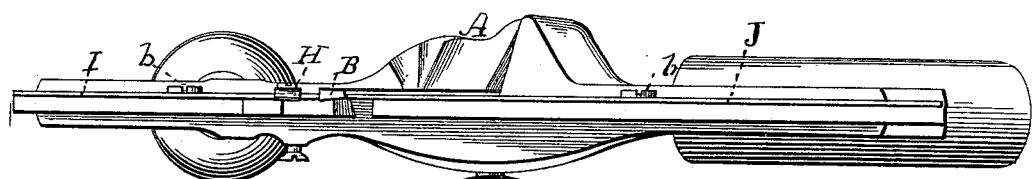
Fig. 12.
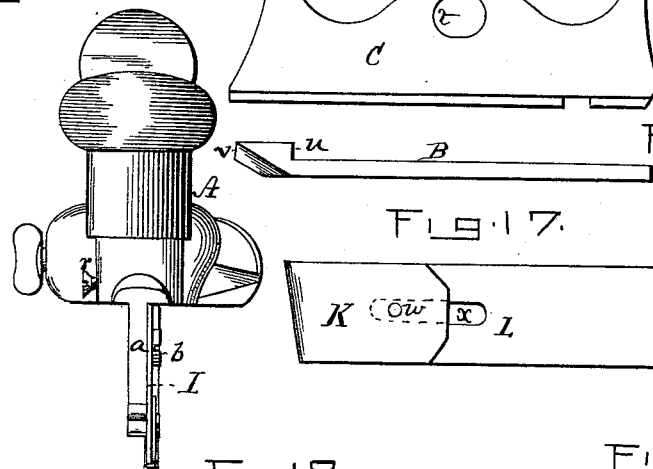
Fig. 13.
Fig. 14.
Fig. 16.
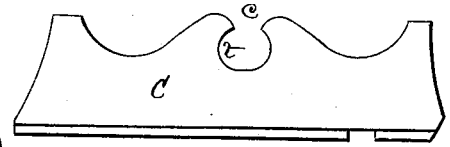
Fig. 15.
Fig. 17.
Fig. 18.
Fig. 19.
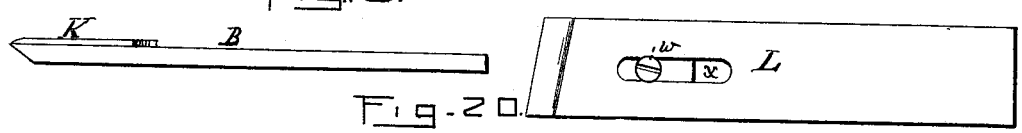
Fig. 20.
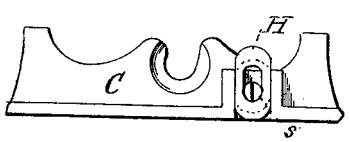
WITNESSES:
Norris A. Clark.
A. S. Browne.
INVENTOR
Amos Fales,
By his attorney,
Jos. S. Brown.
N. PETERS, Photo-Lithographer, Washington, D. C.

UNITED STATES PATENT OFFICE.

AMOS FALES, OF ROCKFALL, CONNECTICUT.

VARIABLE BENCH-PLANE.

SPECIFICATION forming part of Letters Patent No. 348,198, dated August 31, 1886.

Application filed July 29, 1885. Serial No. 172,960. (Model.)

*To all whom it may concern:*

Be it known that I, AMOS FALES, residing in Rockfall, in the county of Middlesex and State of Connecticut, have invented Improvements in Variable Bench-Planes; and I do hereby declare that the following is a full and exact description thereof, reference being had to the accompanying drawings, making part of this specification.

Figure 1:
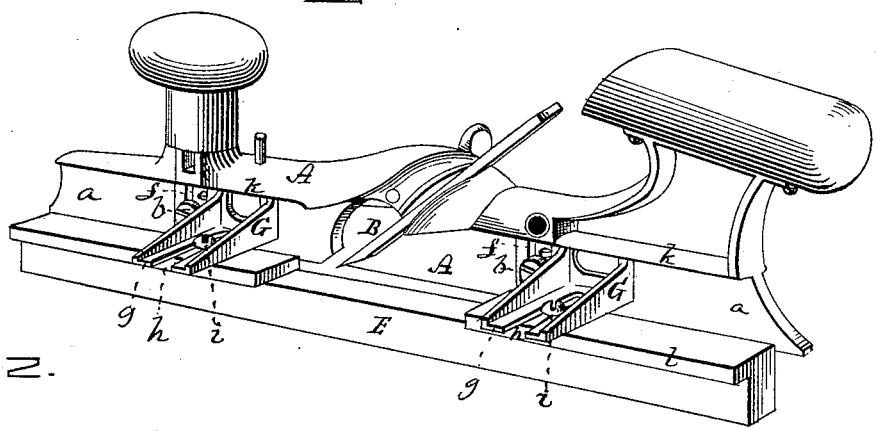
Figure 2:
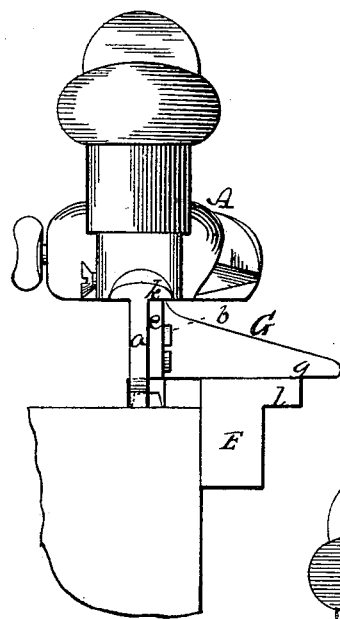
Figure 3:
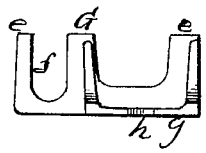
Figure 4:
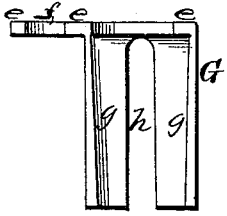
Figure 5:
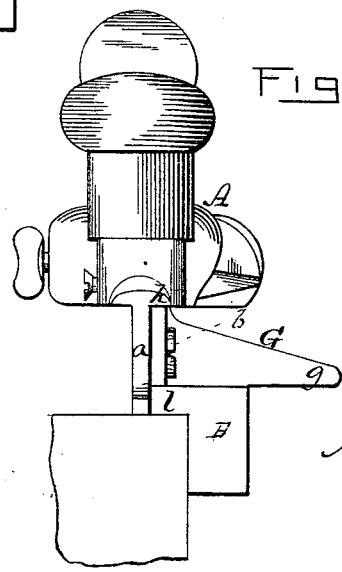

Figure 1 is a view in perspective of the main stock of the instrument as provided with my improved means of applying the fillister and grooving attachments with reversible and adjustable fence; Fig. 2, a front end view of the same; Fig. 3, a side view of one of the attaching-brackets; Fig. 4, a top view of the same; Fig. 5, a front end view of the instrument having its fence reversed for making a front fillister; Fig. 6, a front view of a set of dado-spurs of different sizes; Fig. 7, a side view of one of the spurs; Fig. 8, a side view of the main stock, with a pair of form-plates attached thereto, showing the manner in which the dado-spurs are applied; Fig. 9, a bottom view of the same; Fig. 10, a front view of a spur having only one cutting-point; Fig. 11, a side view of the main stock provided with thin removable extension-flanges for cutting extremely-narrow grooves; Fig. 12, a bottom view of the same; Fig. 13, a front end view of the same; Fig. 14, a side view of the front form-plate constructed to be adjustable lengthwise; Fig. 15, a side view of a special form of cutter used; Fig. 16, an end view of the same; Fig. 17, a top view of a cutter provided with a cap-iron attached thereto; Fig. 18, a side edge view of the same; Fig. 19, a bottom view of the same; Fig. 20, a front view of forward form-plate having a dado-spur.

Like letters designate corresponding parts in all of the figures.

The general construction of the bench-plane on which the present improvements are based is shown and described in the previous patents granted to me March 7, 1882, and April 1, 1884, and numbered, respectively, 254,542 and 295,916. Especially I will refer to one or the other of those patents for the construction of the main stock A, with its flange $a$, for attaching other parts of the instrument thereto, and means for securing the cutters B thereto in, the front and back form-plates, C D, and the reversible fence E.

Referring to those former patents, it will be noted that the front and back form-plates are attached to the downwardly-projecting stock-flange $a$, each by means of a single set-screw, $b$, fitting in a vertical notch or slot, $c$, of the form-plate flange $d$.

The first improvement herein to be described consists in the means whereby grooving and fillister attachments are applied, as shown in Figs. 1, 2, 3, 4, and 5. Two brackets, G G, are employed, constructed substantially as shown—that is, each with a vertical flange, $e$, having a vertical notch or slot, $f$, whereby it is attached to the flange $a$ of the stock by one of the set-screws $b$ $b$, used for attaching the form-plates, which are dispensed with for the special purposes of this device, and each having a horizontal flange, $g$, with a notch or slot, $h$, at right angles to the stock-flange, for attaching the reversible fence E by screws $i$ $i$. The upper edges or terminations, $e$ $e$ $e$, of each bracket are in one horizontal line, in order to fit against the overhanging ledge $k$ of the stock and serve as a guide or gage for placing the bracket in a correct position without care. Thus this entire appendage is attached to the main stock by the same means as the form-plates used for other kinds of work. Fig. 2 shows how the fence thus attached by these brackets is used for grooving.

Fig. 5 shows the fence reversed and provided with an overhanging ledge, $l$, for forming a front fillister. Here the ledge, being in line with the lower edge of the stock-flange $a$, serves for form-plates, which, for this purpose, therefore, are dispensed with. The ledge $l$ is cut away in the middle, so not as to be in the way of the cutter, and not to interfere with the discharge of the shavings. The fence being adjustable laterally allows the grooves to be cut at any desired distance from the front edge of the material, and by employing two stocks—one arranged for grooving and the other for tonguing—no changing from one to the other kind of work is necessary for tonguing and grooving. The vertical flange of each bracket is of such height that when placed in contact with the overhanging ledge $k$ of the main stock the grooves will be cut to the regular or greatest depth required, the distance from the lower surface of the bracket to the lower edge of the stock-flange determining the depth of cut, since the brackets serve as gages to limit the depth of cut. When a shallower cut is desired, the brackets may be adjusted farther down on the stock-flange, both brackets alike, thus obviously effecting the purpose.

Fig. 6 of the drawings shows a front view of a set of dado-spurs of different widths, and Fig. 7 a side view of either one of the spurs. Each spur H is a double spur, having two cutting-points, m m, cutting at both edges of the work cut by the cutter used, whether for dado, fillister, bead, or other form of cutting. Between the cutting-points m m is a space, n, of sufficient depth to admit the form cut, of whatever shape. Each spur has a vertical (preferably round) stem, o, which is inserted in a vertical hole in the plane-stock. Each spur, in combination with a cutter and main-stock flange, is a complete dado. The stem o of each spur is always at the same distance from one extremity and spur, whatever the distance of the other spur from the first spur, so that the various widths of spurs always bear the same relative and proper position on the stock, and all the spurs are attached by the same means.

The means of attaching each spur is shown in Figs. 8 and 9. The round stem o of the spur is inserted in a vertical hole through the main stock A and its flange a, and the body p of the spur has parallel faces or front and back sides, which fit against the sides of a notch, q, in one of the form-plates, which lap over the lower edge of the stock-flange, so that the spur is readily adjusted up and down, and yet is held firmly and accurately in position without turning out of line. The spur is retained in place by a set-screw, r, screwed into the side of the stock. The same general construction and means of attaching the spur apply when it only has one cutting-point, as shown in Fig. 10, and at the right hand in Fig. 6. The spurs are located in advance of the side and center cutters, as shown in Figs. 8 and 9, the front form-plate, C, being notched to receive the spur used a little in advance of the position of the cutter in the main stock, substantially as shown. By this construction cross-grained and curly wood is smoothly cut, the spur-point leading the cutter-edges of the cutter.

Another improvement in my present invention consists in the means by which extremely-narrow grooves may be cut with the instrument. Since the main-stock flange is required to be three-sixteenths of an inch thick, or thereabout, in order to give it sufficient strength with this alone, no groove less than three-sixteenths of an inch wide can be cut therewith. For the purpose of cutting narrower grooves, which are often required or very desirable, I employ extension-flanges I J, front and back, as shown in Figs. 11, 12, and 13. These flanges are made of steel and as thin as required. They extend below the main-stock flange a sufficiently to cut the requisite depth below the same, as shown in Fig. 13. Each extension-flange is secured to the front side of the main-stock flange and reaches up to the overhanging ledge k of the main stock, and is attached to the flange by a single set-screw, b, the same as for attaching the form-plates when used. Thus no change in or addition to the usual construction of the plane is required, except as to the extension-flanges themselves, which are cheaply made. A correspondingly-narrow dado-spur, H, is combined with the front extension-flange, as shown in Figs. 11 and 12. This spur is held in a shallow vertical groove in the front side of the flange, and held there by a set-screw, s. The spur is slotted vertically where held by the screw for the purpose of adjustment. A similar way of attaching a spur to the front form-plate is shown in Fig. 20, the spur being reversible and cutting-edges different. By the above construction a groove not exceeding one-sixteenth of an inch in width may be readily cut, and a double-point spur used to make smooth sides, and a series of narrow grooves from that width up to three-sixteenths is easily made by using spurs and cutters of the various widths required. These extension-flanges can be used with the grooving and fillister attachments above described, or with the auxiliary stocks described in my former patents above mentioned.

Another point of improvement consists in the adjustable mouth for the cutter, so that a wide mouth may be had, when required, or a narrow mouth for cutting the finest shaving without any liability of the front form-plate coming in contact with the edge of the cutter. The mouth is made adjustable simply by means of the front form-plate, C, being made with its attaching notch or slot widened where the attaching-screw passes through it, as shown at t in Figs. 8 and 14. This widening is but little, since the entire adjustment required is quite limited in extent. The head of the attaching-screw will cover the sides of the notch or slot in any position of its adjustment. There is a V-shaped groove, u, or of a form conforming to the shape of the cutter itself, in the front side of the cutter, as shown, forming thereby overhanging cutting-edges v v on both sides of the groove. By this construction the edges overcut, instead of undercutting in the wood, as does the ordinary cutter, so that there is no tendency to raise or tear up the fibers of the wood. With this improved construction of the cutter cross-grained wood may be grooved, and any wood grooved across the grain as smoothly as when the cutter cuts with the grain of the wood. The construction of this cutter will be made the subject-matter of a design patent, it being represented in this application in order to show its mode of application. The cap-iron K is shown as short, only covering a little of the lower end of the cutter B, so that the main part of the cutter is not incumbered therewith, and its body fits in the stock with the cap-iron, the same as if the cap-iron were not there, one form of stock, therefore, serving for such cutters as well as for all other forms of cutters used. The cap-iron is attached by a set-screw, w, passing through a slot, x, in the cutter, as shown in Fig. 19. Thereby the cap-iron is made adjustable to the edge of the cutter. This cap-iron may be applied to dado, fillister, hollow, and round cutters.

I disclaim in this invention form plates or extensions attached to the main flange, such as set forth in Letters Patent No. 295,916, granted to me April 1, 1884, wherein such extensions project at right angles to the main-stock flange, and do not and cannot extend below the said stock-flange.

I claim as my invention—

1. The combination of the stock A, the fence E, and the brackets G G, the said brackets being provided with vertical and vertically-slotted flanges e e, whereby they are adjustably attached to the stock, and with horizontal flanges g g, having slots at right angles to the stock, whereby the fence is attached in position adjustable toward and from the stock, substantially as and for the purpose herein specified.

2. In combination with the stock A and its main attaching-flange a, the vertical plane extension-flanges I J, attached to the side of the main flange, and extending directly downward therefrom and below the same, whereby very narrow grooves may be cut in the material, less in width than the thickness of the said main flange, substantially as herein set forth.

3. The combination of the stock A, having a main attaching-flange, a, a front vertical plane extension-flange, I, removably attached to the said main flange, extending directly downward from and below the lower edge of the said main flange, and provided with a double spur, H, and the rear vertical plane extension-flange, J, removably attached to the main flange and extending directly downward from and below the lower edge thereof, substantially as and for the purpose herein specified.

4. The combination of the stock A, having a flange, a, and front form-plate, C, having an attaching-slot, c, widened from front to back, whereby the said form-plate may be adjusted forward or backward by the attaching-screw b, substantially as and for the purpose herein specified.

AMOS FALES.

Witnesses:
LYMAN A. MILLS,
ERNEST F. COLES.